(12) United States Patent
Nam

(10) Patent No.: US 10,106,941 B1
(45) Date of Patent: Oct. 23, 2018

(54) SNOW REMOVAL DEVICE

(71) Applicant: Ki Bok Nam, Toronto (CA)

(72) Inventor: Ki Bok Nam, Toronto (CA)

( * ) Notice: Subject to any disclaimer, the term of this patent is extended or adjusted under 35 U.S.C. 154(b) by 0 days.

(21) Appl. No.: 15/884,032

(22) Filed: Jan. 30, 2018

(30) Foreign Application Priority Data

Sep. 19, 2017 (KR) .......................... 10-2017-0120424

(51) Int. Cl.
*A01B 1/02* (2006.01)
*E01H 5/02* (2006.01)

(52) U.S. Cl.
CPC ............... *E01H 5/02* (2013.01); *A01B 1/022* (2013.01); *A01B 1/028* (2013.01)

(58) Field of Classification Search
CPC ....................................................... E01H 5/02
USPC .............. 294/49, 54.5, 58, 57, 59, 176, 181; D8/10; 37/265, 285, 434
See application file for complete search history.

(56) References Cited

U.S. PATENT DOCUMENTS

| 3,121,963 | A | * | 2/1964 | Nolan | ........................ | E01H 5/02 |
| | | | | | | 280/47.26 |
| 3,343,807 | A | * | 9/1967 | Moraski | ................. | A01B 1/028 |
| | | | | | | 254/131 |
| 4,910,893 | A | * | 3/1990 | Asay | ......................... | A01K 1/10 |
| | | | | | | 172/364 |
| 5,048,206 | A | * | 9/1991 | Jones | ....................... | B62B 1/147 |
| | | | | | | 280/651 |
| 5,511,327 | A | * | 4/1996 | Jurkowski | ................. | E01H 5/02 |
| | | | | | | 294/54.5 |
| 5,581,915 | A | * | 12/1996 | Lobato | ....................... | E01H 5/02 |
| | | | | | | 280/47.34 |
| 6,219,944 | B1 | * | 4/2001 | Byers | ....................... | B62B 1/147 |
| | | | | | | 37/265 |
| 6,948,268 | B1 | * | 9/2005 | Ronca | ....................... | E01H 5/02 |
| | | | | | | 294/54.5 |
| 9,909,273 | B2 | * | 3/2018 | Al Adawi | ................. | E01H 5/02 |

* cited by examiner

*Primary Examiner* — Paul T Chin
(74) *Attorney, Agent, or Firm* — Fasken Martineau DuMoulin LLP

(57) ABSTRACT

The present disclosure relates to a snow removal device capable of easily throwing snow gathered by a shovel to a predetermined place to easily clear away gathered snow, in other words, the snow removal device of the present disclosure is characterized in that a shovel-pushing means is provided between a shovel and a moving means, a scissor linkage mechanism consisting of a X-link formed by cross-linking links in a X-letter and connected to the shovel via one end thereof and a moving means via the other end is employed as the shovel-pushing means and a push-operation bar having a lower end connected to the moving means is provided at a moving means connection part side of the scissor linkage mechanism to enable the scissor linkage mechanism to be operatively unfolded and the shovel to be operatively pushed. Accordingly, the present disclosure is advantageous in that by providing the shovel-pushing means capable of operatively pushing the shovel from the moving means and throwing gathered snow, it is possible to easily throw gathered snow to a designated place.

5 Claims, 10 Drawing Sheets

SNOW REMOVAL DEVICE

TECHNICAL FIELD OF THE INVENTION

The present disclosure relates to a snow removal device, and more particularly, to a snow removal device configured to allow a shovel to be coupled to a moving body by means of a push means so that snow gathered by the shovel is easily thrown to a predetermined place to easily clear away gathered snow.

BACKGROUND OF THE INVENTION

In general, snow plow is an instrument such as a wooden shovel or a snow shovel, which is capable of manually removing fallen snow.

The above-mentioned snow plow is composed of a shovel having a wide width and being brought into horizontal contact with a ground so as to gather snow well, and a handle connected to the shovel and protruding upward to enable a user to grip it.

When using the above-described snow plow, a user holds the handle in a state in which the shovel is in close contact with a ground, and moves forward to gather snow in one place or throws gathered snow to a place being a certain distance away.

In the conventional snow plow as described above, however, when throwing gathered snow to a place being a certain distance away, unlike a posture taken at the time of gathering snow, a user should hold a central portion and an end portion of the handle and throw snow while lifting up the shovel. This tends to place a large strain on the user's waist, which can be problematic.

SUMMARY OF THE INVENTION

Therefore, the present disclosure provides a solution to the problem of having to change posture when pushing and gathering snow on one hand and when throwing gathered snow to a place being a certain distance away on the other hand using the above conventional snow plow. The present disclosure also addresses the problem arising from a large strain being placed on a user's waist when a user holds a central portion and an end portion of the handle and throws snow while lifting up the shovel.

In other words, the snow removal device of the present disclosure is characterized in that a shovel-pushing means is provided between a shovel and a moving means.

The present disclosure is characterized in that a scissor linkage mechanism consisting of a X-link formed by cross-linking links in a X-letter and connected to the shovel via one end thereof and a moving means via the other end is employed as the shovel-pushing means and a push-operation bar having a lower end connected to the moving means is provided at a moving means connection part side of the scissor linkage mechanism to enable the scissor linkage mechanism to be operatively unfolded and the shovel to be operatively pushed.

A lower end side link is hingedly connected to the shovel side and an upper end side link is connected to a rear side of the shovel to allow a shovel-connection part of the scissor linkage mechanism to be slidably connected to a shovel-sliding bar protruding to an upper end.

The present disclosure is characterized in that the moving means connection part of the scissor linkage mechanism is configured to allow the lower end side link is hingedly connected to the removing means side and the upper end side link is slidably connected to the push-operation bar.

The present disclosure is characterized in that a handle is provided at and extended/protruded from an upper end of the shovel-sliding bar to enable a user to push the snow removal device and a push a foot plate is provided at an upper end side of the push-operation bar to enable the push-operation bar to be rotated downward using a user's foot with respect to the moving means acting as a center of rotation for unfolding the scissor linkage mechanism at the time of throwing gathered snow.

The present disclosure is characterized in that a handle is provided at and extended/protruded from an upper end of the push-operation bar to enable the push-operation bar to be rotated downward using a user's hand with respect to the moving means acting as a center of rotation for unfolding the scissor linkage mechanism at the time of gathering snow, pushing the snow removal device and throwing gathered snow.

The present disclosure is characterized in that the moving means includes a wheel frame connected to the moving means connection part of the scissor linkage mechanism and wheels provided at both sides of the wheel frame.

The present disclosure is characterized in that the moving means includes a skid frame connected to the moving means connection part of the scissor linkage mechanism and being in slide-contact with a ground.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
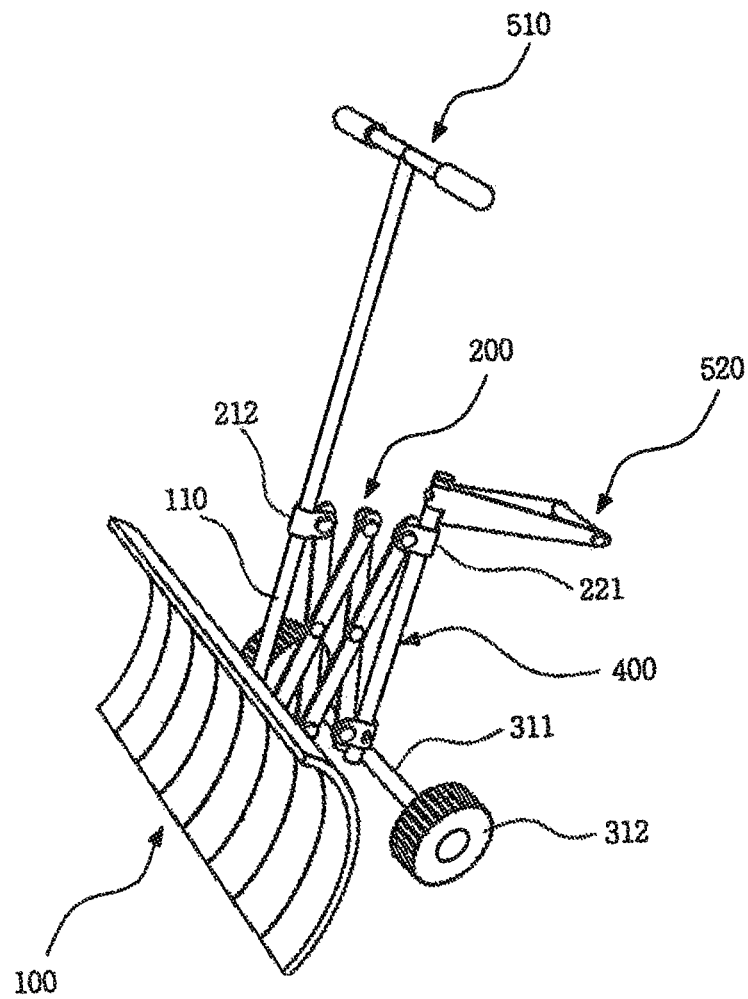
FIG. 1 is an exemplary front perspective view of one embodiment of the snow removal device in accordance with the present disclosure showing the scissor linkage mechanism in a retracted position.
Figure 2:
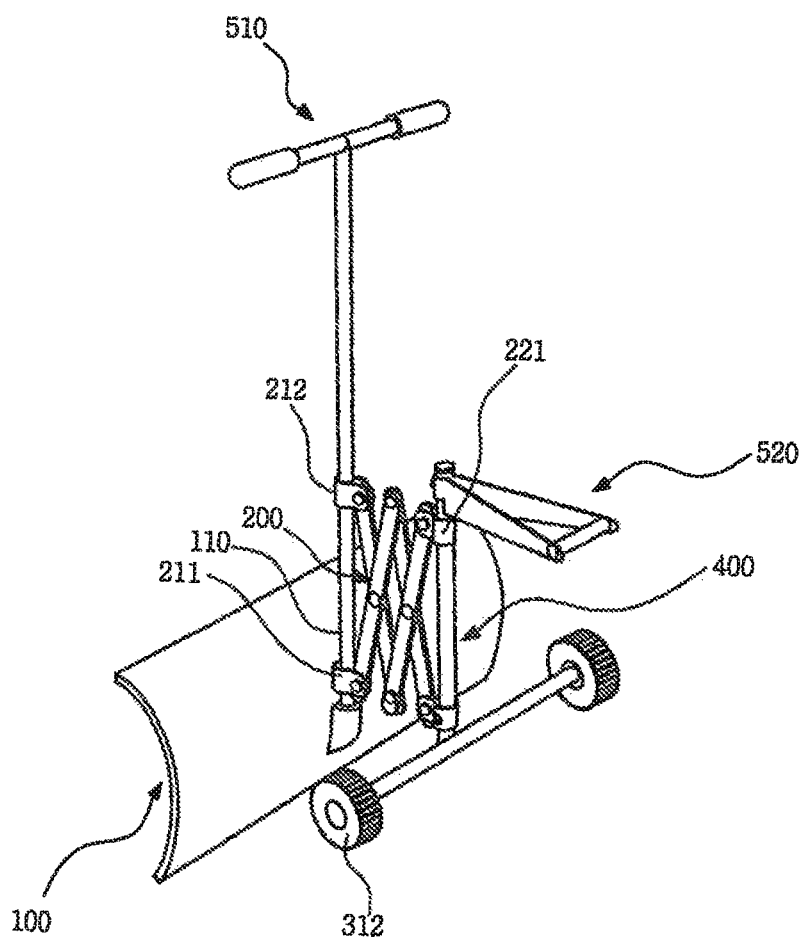
FIG. 2 is an exemplary rear perspective view of the snow removal device shown in FIG. 1.
Figure 3:
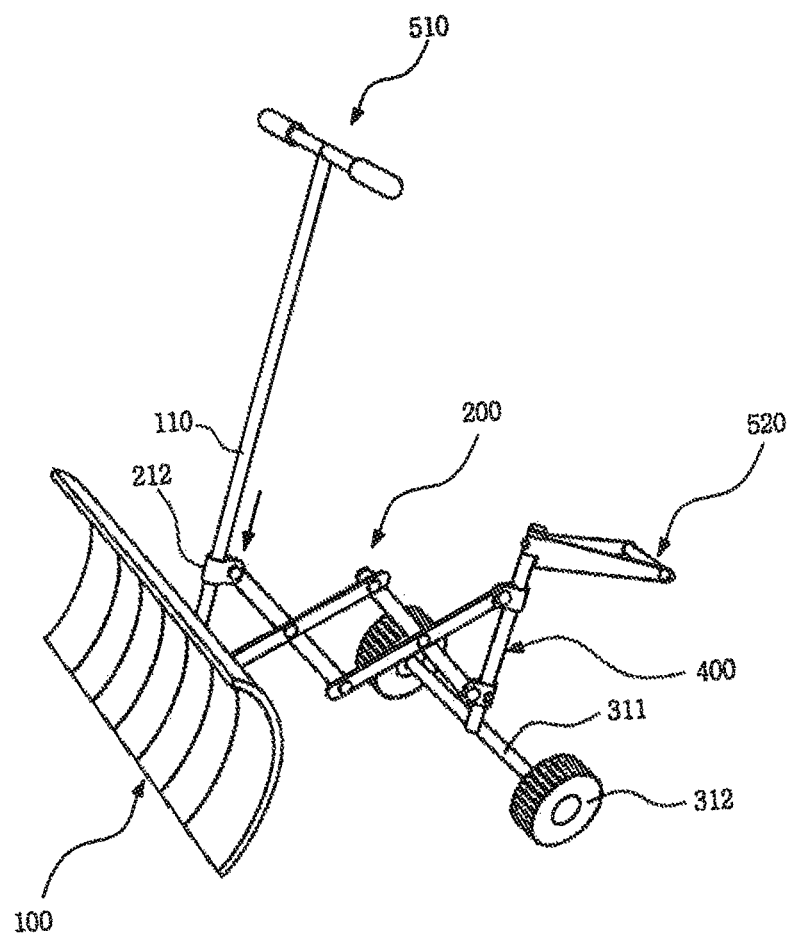
FIG. 3 is another exemplary front perspective view similar to that illustrated in FIG. 1 showing the scissor linkage mechanism in an extended position.

The description which follows, and the embodiments described therein are provided by way of illustration of an example, or examples of particular embodiments of principles and aspects of the present invention. In this description like parts are marked throughout the disclosure and the drawings with the same respective reference numerals.

The present disclosure is directed to a snow removal device which can easily throw gathered snow to a predetermined place to easily remove snow.

Referring to FIGS. 1 to 5, the snow removal device includes a shovel 100 and a moving means provided with a shovel-pushing means between the shovel 100 and the moving means.

Here, the shovel-pushing means includes a scissor linkage mechanism 200 having a X-link formed by cross-linking links in a X-letter, and connected to the shovel 100 via one end thereof and the moving means via the other end thereof.

In addition, the snow removal device of the present disclosure includes a push-operation bar 400 provided on a moving means connection part side of the scissor linkage mechanism 200, and this push-operation bar is connected to the moving means via a lower end thereof to allow the scissor linkage mechanism 200 to be operatively expanded to operatively push the shovel 100.

The moving means includes a wheel frame 311 connected to the moving means connection part of the scissor linkage mechanism 200 and wheels 312 provided at both sides of the wheel frame 311, respectively.

Figure 7:
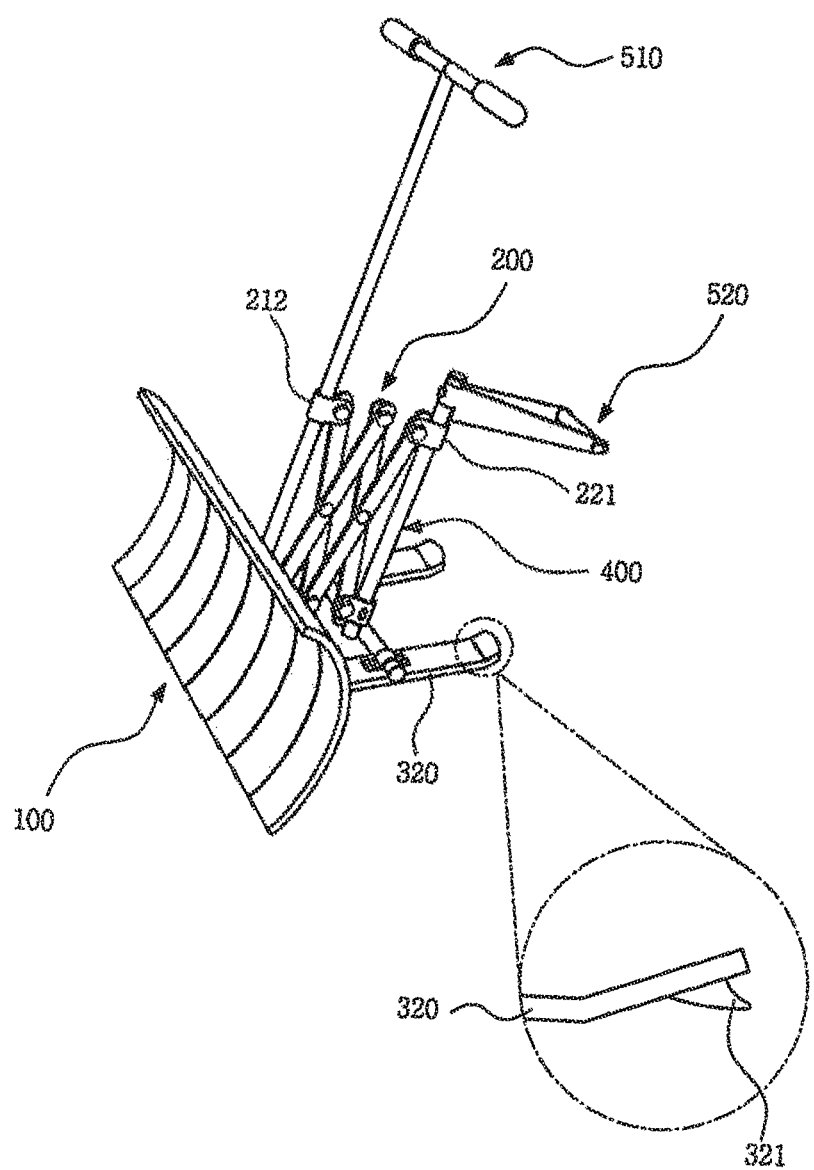
FIG. 7 is an exemplary view illustrating another embodiment of the snow removal device in accordance with the present disclosure in which a skid frame is configured as a removing means.

Optionally, a skid frame 320 may be connected to the moving means connection part of the scissor linkage mechanism 200 and may be placed in sliding-contact with the ground, such an embodiment is shown in FIG. 7.

In that embodiment, a rear end portion of the skid frame 320 may be bent upward at a certain angle and a brake protrusion 321 protruding downward may be formed at an end portion of a lower surface of the bent end portion of the skid frame. Here, the brake protrusion is curved so that a protruded end of the brake protrusion is directed rearward.

Returning back to the embodiment shown in FIGS. 1 to 5, a lower end side link is hingedly connected to the shovel 100 side and an upper end side link is connected to a rear side of the shovel 100 so that a shovel-connection part of the scissor linkage mechanism 200 is slidably connected to a shovel-sliding bar 110 protruded to an upper end.

The lower end side link maybe hingedly coupled to a shovel connection tube 211 connected to a lower end of the shovel-sliding bar 110 so that the lower end side link is connected to the shovel 100 via the shovel connection tube 211.

The upper end side link is hingedly coupled to a shovel-sliding tube 212 which is slidably coupled to the shovel-sliding bar 110, so that the upper end side link may be connected to the shovel-sliding bar 110 via the shovel-sliding tube 212.

The moving means connection part of the scissor linkage mechanism 200 may be configured such that the lower end side link is hingedly connected to the moving means side and the upper end side link is slidably connected to the push-operation bar 400.

The upper end side link is hingedly coupled to a bar-sliding tube 221 which is slidably coupled to the push-operation bar 400 so that the upper end side link is connected to the push-operation bar 400 via the bar-sliding tube 221.

In the embodiment shown in FIGS. 1 to 5, meanwhile, the snow removal device may include a handle 510 provided at and extending/protruded from an upper end of the shovel-sliding bar 110 to enable a user to push the snow removal device and gather snow, and a push foot plate 520 provided at an upper end side of the push-operation bar 400 to rotate the push-operation bar 400 downward using a user's foot with respect to the moving means acting as a center of rotation. Therefore, the scissor linkage mechanism 200 may be operatively unfolded by downward rotation of the push-operation bar 400 when the snow removal device throws gathered snow.

The handle 510 includes a vertical handle bar which is vertically formed and a grip handle protruded from both sides of the vertical handle bar.

Figure 8:
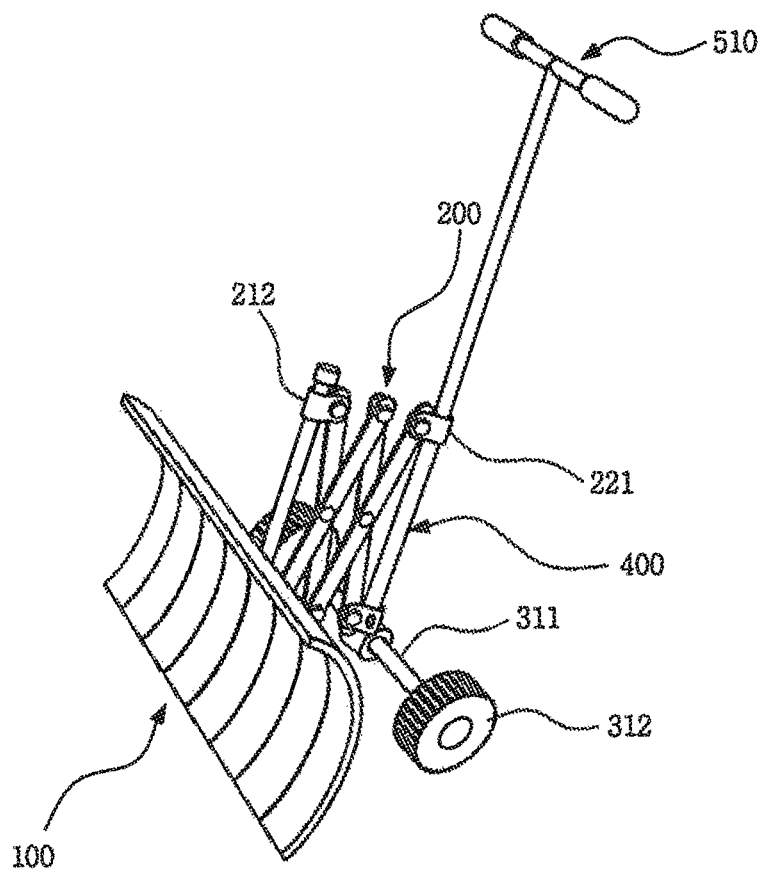
FIG. 8 is an exemplary view illustrating another embodiment of the snow removal device in accordance with the present disclosure in which a handle is provided on a push-operation bar.

In an alternative in the embodiment of the present invention shown in FIG. 8, the snow removal device may include the handle 510 provided at and extending/protruding from the upper end of the push-operation bar 400 to enable a user to push the snow removal device for gathering snow and to rotate the push-operation bar 400 downward using his/her hand with respect to the moving means acting as a center of rotation. Therefore, the scissor linkage mechanism 200 may be unfolded by downward rotation of the push-operation bar 400 when a user throws gathered snow.

At this time, the push-operation bar 400 is configure to enable a lower end thereof to be rotatably coupled to the moving means.

Figure 9:
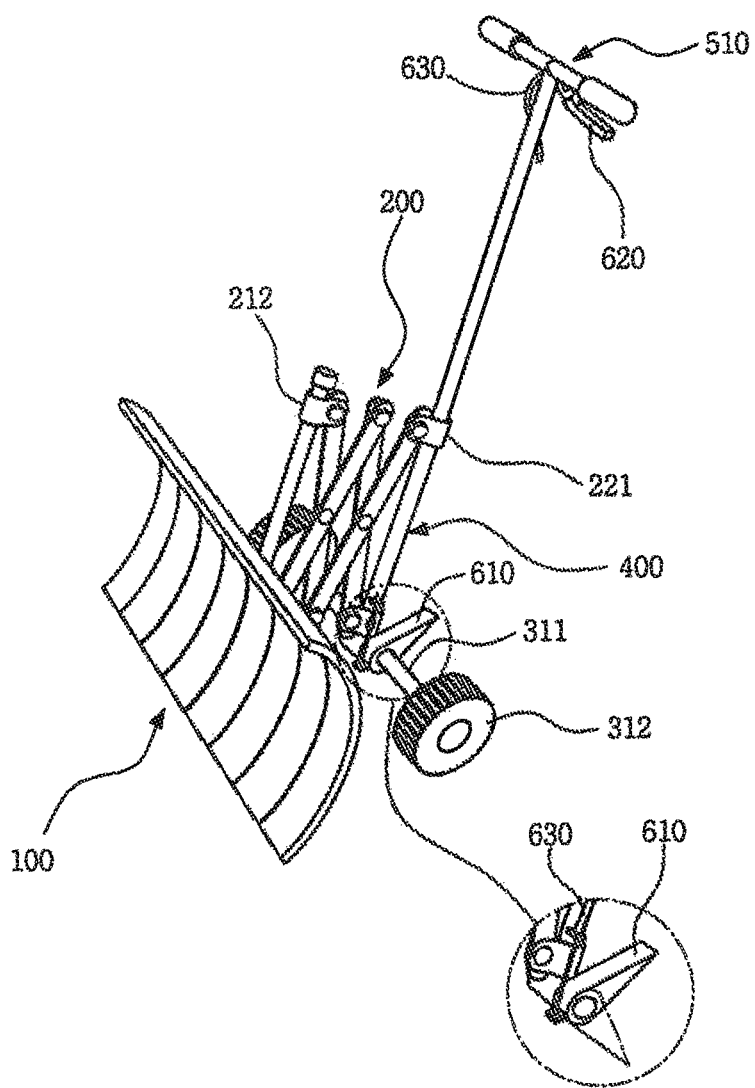
FIG. 9 is an exemplary view illustrating another embodiment of the snow removal device in accordance with the present disclosure.

Meanwhile, while the moving means of the snow removal device includes the wheel frame 311 and the wheels 312, the wheel frame 311 may also be provided with a frame stopper 610 for restricting a rotation of the wheel frame 311 when the push-operation bar 400 is being rotated. An alternative embodiment of a snow removal device including a frame stopper 610 is shown in FIG. 9.

The frame stopper 610 is connected to a lever 620 provided on the handle 510 via an operational cable 630 and may be selectively deployed according to a manipulation of the lever 620 so as not to be interfered by a ground when the snow removal device is pushing snow or is being moved.

Figure 4:
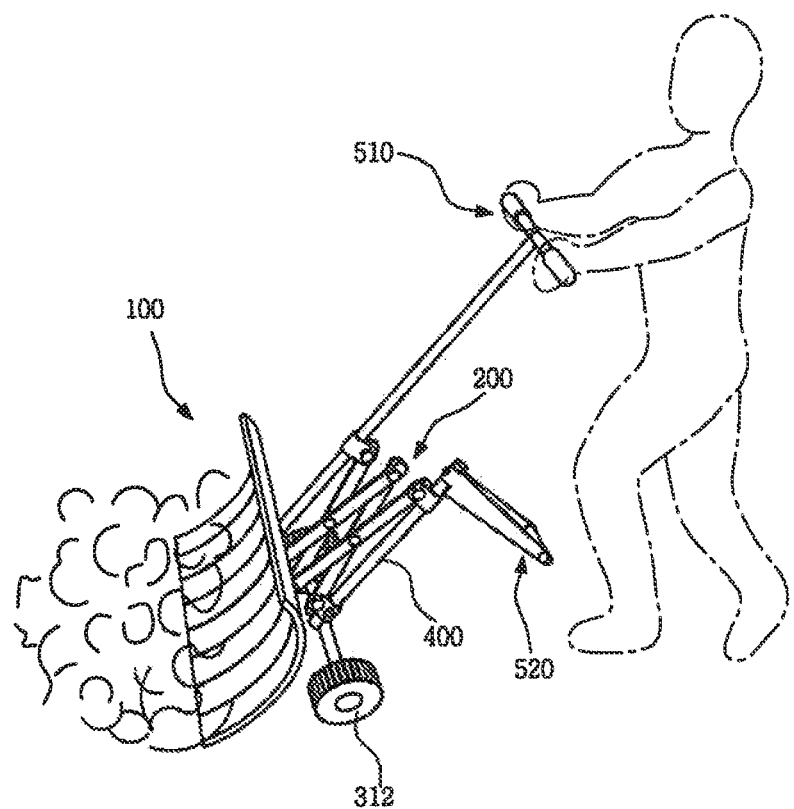
FIG. 4 is an exemplary view of the snow removal device shown in FIG. 1 illustrating a snow-pushing process using the snow removal device.
Figure 5:
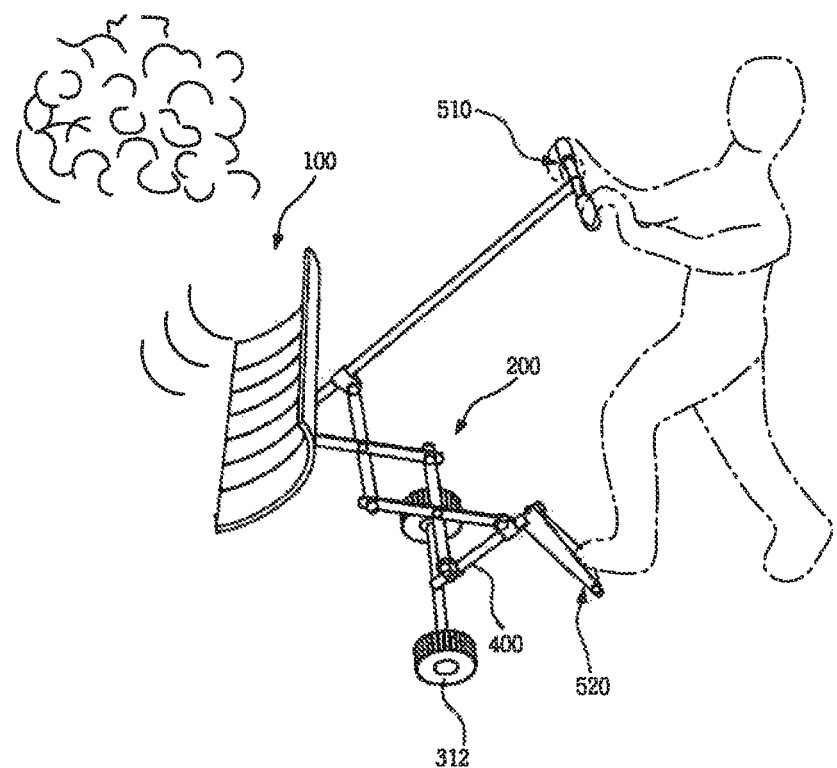
FIG. 5 is an exemplary view similar to that shown in FIG. 4 illustrating a snow-throwing process using the snow removal device.
Figure 6:
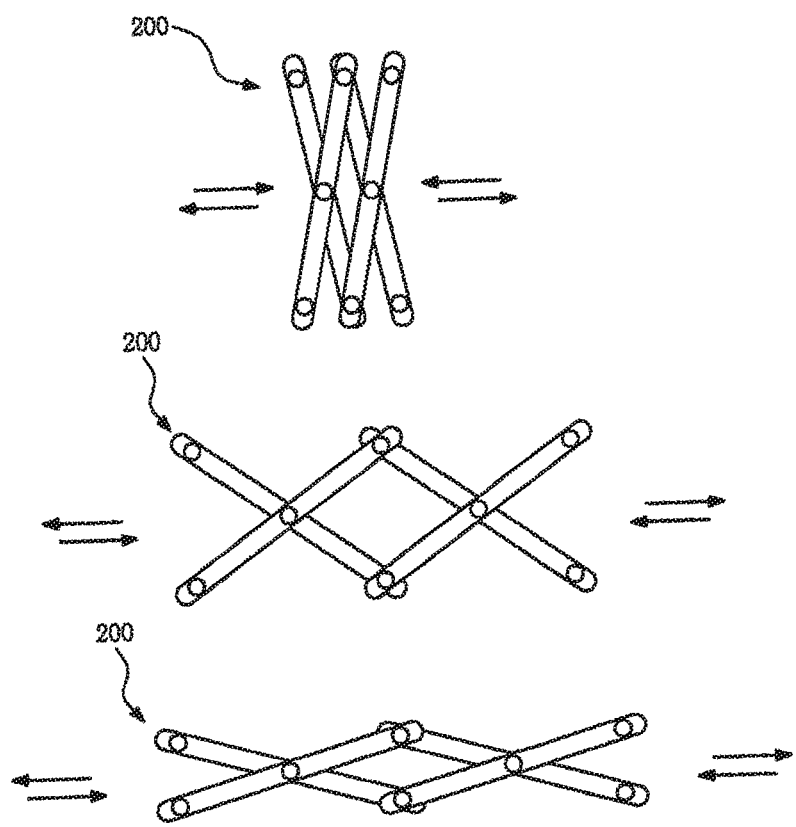
FIG. 6 is an exemplary view illustrating an operation of the scissor linkage mechanism according to the present disclosure.

The mode of operation of the snow removal device is described below and shown in FIGS. 4, 5 and 6.

In the above-described snow removal device, the shovel-pushing means is provided between the shovel 100 and the moving means, the scissor linkage mechanism 200 is employed as the shovel-pushing means, and the push-operation bar 400 having the lower end connected to the moving means is provided at the moving means connection part side of the scissor linkage mechanism 200 to enable the scissor linkage mechanism 200 to be unfolded and the shovel 100 to be operatively pushed. Due to the above configuration, as the push-operation bar 400 is rotated with respect to the moving means acting as a center of rotation, the scissor linkage mechanism is unfolded or extended so that the shovel 100 can be easily pushed by small force, and it is thus possible for the shovel 100 to easily throw snow gathered by the shovel 100 to a predetermined place.

In the embodiment of the present disclosure, meanwhile, the lower end side link is hingedly connected to the shovel 100 side and the upper end side link is connected to the rear side of the shovel 100 so that the shovel-connection part of the scissor linkage mechanism 200 is slidably connected to the shovel-sliding bar 110 protruding to an upper end. Due to the above configuration, when the scissor linkage mechanism 200 is unfolded or extended, the shovel connection tube 211 hingeably connected to the rear side of the shovel 100 is maintained in a fixed state at the lower end of the shovel-sliding bar 110, and the shovel-sliding tube 212 coupled to the upper end side is moved downward from the shovel-sliding bar 110 so that the gathered snow can be thrown by the shovel 100 as the scissor linkage mechanism 200 is unfolded or extended.

Figure 10:
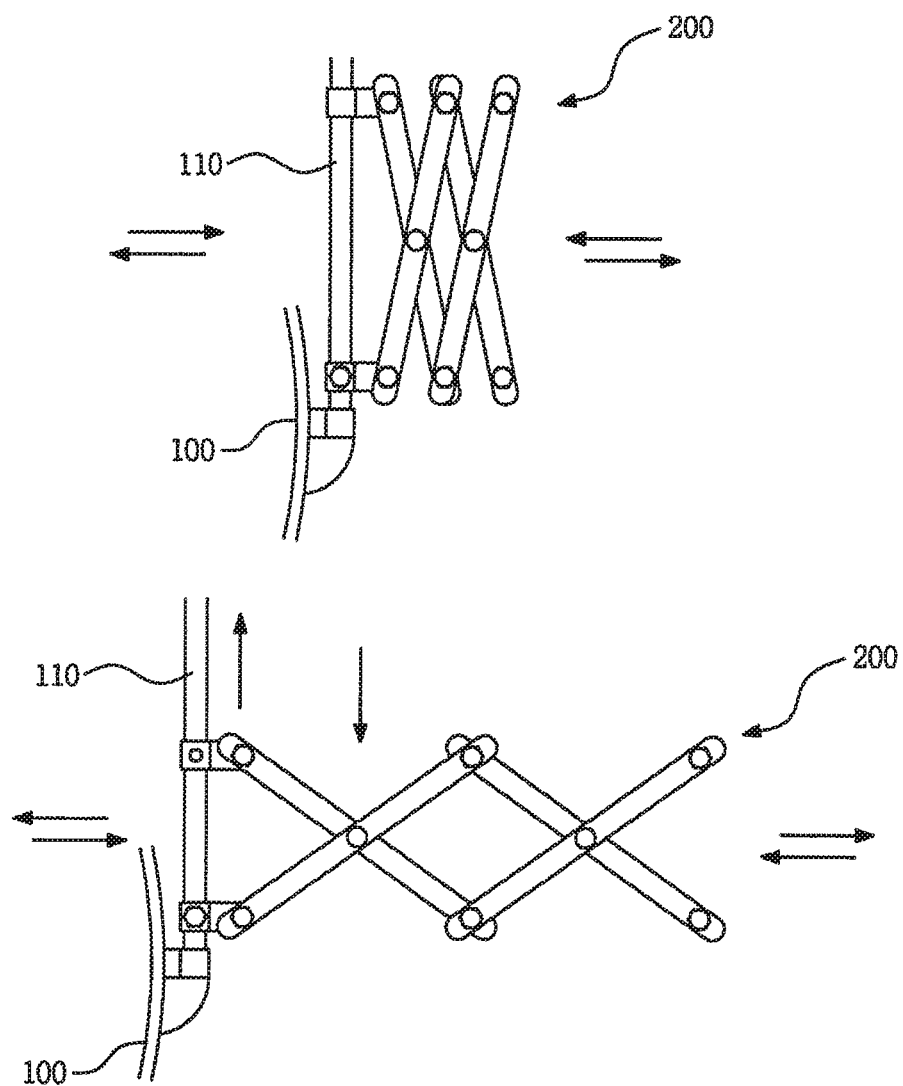
FIG. 10 is an exemplary view illustrating an operation of a shovel-sliding bar according to the present disclosure.

In addition, when the scissor linkage mechanism 200 is folded or retracted after throwing snow, the shovel-sliding tube 212 coupled to the upper end side of the shovel-sliding bar 110 is moved to an upper side of the shovel-sliding bar 110 so that the scissor linkage mechanism 200 is folded or retracted and the shovel 100 is brought into a state in which the shovel 100 can gather snow again, as shown in FIG. 10.

In the embodiment of the present disclosure, in addition, as the moving means is composed of the wheel frame 311 and the wheels 312 provided at both sides of the wheel frame 311, it is possible to easily move the snow removal device when pushing snow or moving the snow removal device.

In the embodiment shown in FIG. 7, when the snow removal device is provided with the skid frame 320 which is in sliding-contact with the ground, the snow removal device can be easily moved on an icy road or a soft ground and it is possible to reduce manufacturing cost of the snow removal device.

In addition, if the rear end portion of the skid frame 320 is bent upward at a certain angle and the brake protrusion 321 protruding downward and curved rearward is formed at an end of the lower surface of the bent end portion of the skid frame 320, when the shovel 100 is operatively pushed from the moving means and throws gathered snow, the brake protrusion 321 is brought into contact with the ground opposite a place to which snow is thrown so that the snow removal device does not slide backward. Accordingly, force generated when the scissor linkage mechanism 200 is unfolded or extended is directed only in one direction, so that snow can be effectively thrown.

In addition, in the snow removal device shown in FIGS. 1 to 5, the handle 510 is provided at and extends/protrudes from the upper end of the shovel-sliding bar 110 to enable a user to push the snow removal device and gather snow, and the push foot plate 520 is provided at an upper end side of the push-operation bar 400 to enable the push-operation bar 400 to be rotated downward using a user's foot with respect to the moving means acting as a center of rotation for unfolding the scissor linkage mechanism 200 at the time of throwing gathered snow. Accordingly, a user may stably hold the shovel 100 with the handle 510, and may press the push foot plate 520 with foot to throw gather snow easily and far away at the time of throwing gathered snow.

Furthermore, in the snow removal device to which the present disclosure is applied, when the handle 510 is provided at and extends/protrudes from the upper end of the push-operation bar 400 to enable a user to rotate the push-operation bar 400 downward using his/her hand with respect to the moving means acting as a center of rotation for operatively unfold the scissor linkage mechanism 200, the push-operation bar 400 is rotated by a large torque by the handle 510 remote from the moving means and the scissor linkage mechanism 200 may be thus unfolded or extended with a large force to throw snow far away.

Meanwhile, in the embodiment shown in FIG. 9, the push-operation bar 400 is configured to enable the lower end thereof to be rotatably coupled to the moving means, the moving means is composed of the wheel frame 311 and the wheels 312, and the frame stopper 610 for restricting a rotation of the wheel frame 311 at the time of rotating the push-operation bar 400 is provided at the wheel frame 311. Due to this configuration, a rotation of the wheel frame 311 is restricted when the push-operation bar 400 is rotated so that a rotational force of the push-operation bar 400 may be exactly applied as an unfolding or extending force of the scissor linkage mechanism 200 to clearly unfold or extend the scissor linkage mechanism 200.

In the embodiment of the present disclosure, in addition, when the frame stopper 610 is connected to the lever 620 provided on the handle 510 via the operational cable 630 to be selectively deployed according to a manipulation of the lever 620, an interference caused by the frame stopper 610 is prevented during a snow-pushing operation using the snow removal device or a movement of the snow removal device.

The present disclosure is advantageous in that by providing the shovel-pushing means capable of operatively pushing the shovel from the moving means and throwing gathered snow, it is possible to easily throw gathered snow to a designated place.

In addition, the present disclosure is advantageous in that since the scissor linkage mechanism is employed as the shovel-pushing means, the handle is provided at the shovel connection part of the scissor linkage mechanism and the push foot plate is provided at the push-operation bar provided in the moving means connection part of the scissor linkage mechanism, a user holds stably the shovel with the handle and unfolds operatively the scissor linkage mechanism with his/her foot to stably throw snow using the shovel.

Furthermore, the present disclosure is advantageous in that since the scissor linkage mechanism is employed as the shovel-pushing means, the handle is provided at the push-operation bar provided in the moving means connection part of the scissor linkage mechanism, it is possible to stably throw snow with the handle and push force is maximized by a rotational torque generated by the handle remote from the moving means when the scissor linkage mechanism is operatively unfolded or extended for throwing snow to enable snow to be thrown farther.

It will be apparent to those skilled in the art that various modifications can be made to the above-described exemplary embodiments of the present disclosure without departing from the principles taught by the disclosure. Thus, it is intended that the present disclosure covers all such modifications provided they come within the scope of the appended claims.

REFERENCE NUMERALS IN THE DRAWINGS

100: Shovel
110: Shovel-sliding bar
200: Scissor linkage mechanism
211: Shovel connection tube
212: Shovel-sliding tube
221: Bar-sliding tube
311: Wheel frame
312: Wheel
320: Skid frame
400: Push-operation bar
510: Handle
520: Push foot plate
610: Frame stopper
620: Lever
630: Operation cable

What is claimed is:
1. A snow removal device, characterized in that a shovel-pushing means is provided between a shovel 100 and a moving means, a scissor linkage mechanism 200 connected to the shovel 100 via one end thereof and the moving means via the other end is employed as the shovel-pushing means, a push-operation bar 400 having a lower end connected to the moving means is provided at a moving means connection part side of the scissor linkage mechanism 200 to enable the scissor linkage mechanism 200 to be unfolded and the shovel 100 to be pushed.

2. The snow removal device of claim 1, characterized in that a lower end side link is hingedly connected to the shovel 100 side and an upper end side link is connected to a rear side of the shovel 100 to allow a shovel-connection part of the scissor linkage mechanism 200 to be slidably connected to a shovel-sliding bar 110 protruding to an upper end, and the moving means connection part of the scissor linkage mechanism 200 is configured to allow the lower end side link is hingedly connected to the moving means side and the upper end side link is slidably connected to the push-operation bar 400.

3. The snow removal device of claim 2, characterized in that a handle 510 is provided at and extended/protruded from an upper end of the shovel-sliding bar 110 to enable a user to push the snow removal device and a push foot plate 520 is provided at an upper end side of the push-operation bar 400 to enable the push-operation bar 400 to be rotated downward using a user's foot with respect to the moving means acting as a center of rotation for unfolding the scissor linkage mechanism 200 at the time of throwing gathered snow.

4. The snow removal device of claim 2, characterized in that a handle 510 is provided at and extended/protruded from an upper end of the push-operation bar 400 to enable the push-operation bar 400 to be rotated downward using a user's hand with respect to the moving means acting as a center of rotation for unfolding the scissor linkage mechanism 200 at the time of gathering snow, pushing the snow removal device and throwing gathered snow.

5. The snow removal device of claim 1, characterized in that the moving means is any one selected from a configuration comprising a wheel frame 311 connected to the moving means connection part of the scissor linkage mechanism 200 and wheels 312 provided at both sides of the wheel frame 311 and a configuration comprising a skid frame 320 connected to the moving means connection part of the scissor linkage mechanism 200 and being in slide-contact with a ground.

* * * * *